(12) United States Patent
Kim et al.

(10) Patent No.: US 11,453,337 B2
(45) Date of Patent: Sep. 27, 2022

(54) METHOD AND APPARATUS WITH THREE-DIMENSIONAL OBJECT DISPLAY

(71) Applicant: Samsung Electronics Co., Ltd., Suwon-si (KR)

(72) Inventors: Jiyeon Kim, Hwaseong-si (KR); Wooshik Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 16/881,199

(22) Filed: May 22, 2020

(65) Prior Publication Data
US 2021/0146839 A1 May 20, 2021

(30) Foreign Application Priority Data

Nov. 19, 2019 (KR) .......................... 10-2019-0148843

(51) Int. Cl.
*G06K 9/00* (2022.01)
*B60R 1/00* (2022.01)
(Continued)

(52) U.S. Cl.
CPC .............. *B60R 1/001* (2013.01); *B60K 35/00* (2013.01); *H04N 13/111* (2018.05); *B60K 2370/1531* (2019.05); *B60K 2370/176* (2019.05); *B60K 2370/177* (2019.05); *B60K 2370/193* (2019.05); *B60R 2300/205* (2013.01); *B60R 2300/308* (2013.01); *B60R 2300/804* (2013.01)

(58) Field of Classification Search
CPC .......................... B60W 30/12; B60W 2552/30
See application file for complete search history.

(56) References Cited

U.S. PATENT DOCUMENTS

2004/0183663 A1\* 9/2004 Shimakage ............... G06T 7/73
701/1
2009/0207170 A1\* 8/2009 Matsunaga ............ G01C 21/32
345/427
(Continued)

FOREIGN PATENT DOCUMENTS

JP         2014-110059 A     6/2014
KR   10-2006-0034497 A     4/2006
(Continued)

OTHER PUBLICATIONS

Nedevschi et al., "Increased Accuracy Stereo Approach for 3D Lane Detection," Intelligent Vehicles Symposium 2006, Jun. 13-15, 2006, Tokyo, Japan, pp. 42-49.
(Continued)

*Primary Examiner* — Nan-Ying Yang
(74) *Attorney, Agent, or Firm* — NSIP Law

(57) ABSTRACT

A method of displaying a three-dimensional (3D) object includes acquiring a driving image from a single camera, classifying line marks including a road surface into one or more groups based on a change in a curvature of a line of the road surface, estimating a pitch angle corresponding to an angle of inclination between the road surface and the single camera for each of the one or more groups, generating 3D information of the road surface, and displaying an 3D object visually overlaid on the road surface based on the 3D information of the road surface.

28 Claims, 8 Drawing Sheets

(51) Int. Cl.
*B60K 35/00* (2006.01)
*G09G 5/00* (2006.01)
*H04N 13/111* (2018.01)

(56) References Cited

U.S. PATENT DOCUMENTS

| | | | |
|---|---|---|---|
| 2013/0181982 A1 | 7/2013 | Tasaki et al. | |
| 2017/0277952 A1 | 9/2017 | Thommes et al. | |
| 2018/0067494 A1* | 3/2018 | Schiffmann | G06V 20/588 |
| 2019/0213402 A1* | 7/2019 | Yang | G06V 40/20 |
| 2020/0104607 A1 | 4/2020 | Kim et al. | |

FOREIGN PATENT DOCUMENTS

| | | |
|---|---|---|
| KR | 10-2015-0091064 A | 8/2015 |
| KR | 10-1634283 B1 | 6/2016 |
| KR | 10-2018-0131573 A | 12/2018 |
| KR | 10-2019-0053217 A | 5/2019 |

OTHER PUBLICATIONS

Extended European Search Report dated Oct. 2, 2021 in counterpart European Patent Application No. 20193738.0 (10 pages in English).
Danescu, et al. "New results in stereovision based lane tracking." *2011 IEEE Intelligent Vehicles Symposium (IV)*. IEEE, Jun. 5-9, 2011. (6 pages in English).

* cited by examiner

METHOD AND APPARATUS WITH THREE-DIMENSIONAL OBJECT DISPLAY

CROSS-REFERENCE TO RELATED APPLICATIONS

This application claims the benefit under 35 USC § 119(a) of Korean Patent Application No. 10-2019-0148843, filed on Nov. 19, 2019, in the Korean Intellectual Property Office, the entire disclosure of which is incorporated herein by reference for all purposes.

BACKGROUND

1. Field

The following description relates to a method and apparatus with three-dimensional (3D) object display.

2. Description of Related Art

Three-dimensional (3D) information of a road surface is used to generate information for autonomous driving and an advanced driver-assistance system (ADAS). For example, the 3D information of the road surface may be obtained by calculating a disparity through a comparison between a left image and a right image, acquired using a stereo camera, and estimating depth information of all areas, including the road surface, based on the disparity. However, when a single camera is used, it is difficult to estimate depth information by calculating disparity. Accordingly, it may be difficult to acquire the 3D information of the road surface using a single camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of displaying a three-dimensional (3D) object includes acquiring a driving image, including a road surface from a single camera, classifying line marks of the road surface into one or more groups based on a degree of change in a curvature of a line of the road surface, estimating a pitch angle of the road surface corresponding to an angle of inclination between the road surface and the single camera for each of the one or more groups, generating 3D information of the road surface using the pitch angle for each of the one or more groups, and displaying an 3D object visually overlaid on the road surface based on the 3D information of the road surface.

The classifying of the line marks into the one or more groups may include grouping the line marks based on the degree of change in the curvature of the line.

The classifying of the line marks into the one or more groups may include comparing the degree of change in the curvature of the line to a reference variation, and classifying the line marks into a plurality of groups based on a point at which the degree of change in the curvature is greater than the reference variation based on a result of the comparing.

Each of the one or more groups may form a corresponding flat plane different from each other on the road surface.

The estimating of the pitch angle may include converting a partial image of the driving image for each of the one or more groups to a bird's-eye-view (BEV) image for each of the one or more groups, and estimating the pitch angle of the road surface based on the BEV image for each of the one or more groups.

The estimating of the pitch angle may include estimating, as the pitch angle of the road surface, a pitch angle satisfying at least one of a first condition that line marks included in the BEV image for each of the one or more groups are parallel to each other and a second condition that the line marks have the same length.

The estimating of the pitch angle may include calculating positions of the line marks included in the BEV image for each of the one or more groups based on an initial pitch angle, repeatedly adjusting the pitch angle until at least one of the first condition and the second condition is satisfied, and determining a pitch angle satisfying at least one of the first condition and the second condition as the pitch angle of the road surface.

The driving image may include image sequences over time. The generating of the 3D information of the road surface may include smoothing the pitch angle of the road surface for each of the one or more groups over time, and generating the 3D information of the road surface included in the driving image using the smoothened pitch angle.

The smoothing of the pitch angle may include smoothing, using a temporal filter, the pitch angle of the road surface for each of the one or more groups over time.

The displaying of the 3D object may include rendering a 3D road model reflecting the 3D information of the road surface; and displaying the 3D object on the 3D road model.

The method may further include extracting lines of the road surface corresponding to a driving lane from the driving image and calculating curvatures of the extracted lines.

The extracting of the lines of the road surface may include detecting lines that have lengths greater than or equal to a predetermined length and that are included in the driving image by searching for an edge from the driving image, and estimating the lines of the road surface corresponding to the driving lane by grouping the detected lines based on a driving direction.

The method may further include extracting a left line and a right line of the driving lane from the driving image and calculating curvatures of the left line and the right line of the driving lane.

The method may further include outputting the 3D information of the road surface.

The driving image may include at least one of an RGB image and a gray image.

In another general aspect, an apparatus for displaying a 3D object includes a communication interface configured to acquire a driving image from a single camera, a processor configured to classify line marks into one or more groups based on a degree of change in a curvature of a line of a road surface included in the driving image, to estimate a pitch angle of the road surface corresponding to an angle of inclination between the road surface and the single camera for each of the one or more groups, to generate 3D information of the road surface included in the driving image using the pitch angle of the road surface for each of the one or more groups and to represent an 3D object on the road surface based on the 3D information of the road surface, and a display configured to display a 3D road model representing the 3D object.

The processor may be configured to group the line marks based on the degree of change in the curvature of the line.

The processor may be configured to compare the degree of change in the curvature of the line to a reference variation, and to classify the line marks into a plurality of groups based on a point at which the degree of change in the curvature is greater than the reference variation based on a result of the comparing.

Each of the one or more groups may form flat planes distinguished from each other on the road surface.

The processor may be configured to convert a partial image of the driving image for each of the one or more groups to a BEV image for each of the one or more groups, and to estimate the pitch angle of the road surface based on the BEV image for each of the one or more groups.

The processor may be configured to estimate, as the pitch angle of the road surface, a pitch angle satisfying at least one of a first condition that line marks included in the BEV image for each of the one or more groups are parallel to each other and a second condition that the line marks have the same length.

The processor may be configured to calculate positions of the line marks included in the BEV image for each of the one or more groups based on an initial pitch angle, to repeatedly adjust the pitch angle until at least one of the first condition and the second condition is satisfied, and to determine a pitch angle satisfying at least one of the first condition and the second condition as the pitch angle of the road surface.

The driving image may include image sequences over time. The processor may be configured to smooth the pitch angle of the road surface for each of the one or more groups over time, and to generate the 3D information of the road surface included in the driving image using the smoothened pitch angle.

The processor may be configured to smooth, using a temporal filter, the pitch angle of the road surface for each of the one or more groups over time.

The processor may be configured to render a 3D road model reflecting the 3D information of the road surface, and to represent the 3D object on the 3D road model.

The processor may be configured to extract lines of the road surface corresponding to a driving lane from the driving image, and to calculate curvatures of the extracted lines.

The processor may be configured to detect lines that have lengths greater than or equal to a predetermined length and that are included in the driving image by searching for an edge from the driving image, and to estimate the lines of the road surface corresponding to the driving lane by grouping the detected lines based on a driving direction.

The processor may be configured to extract a left line and a right line of the driving lane from the driving image, and to calculate curvatures of the left line and the right line of the driving lane.

The communication interface may be configured to output the 3D information of the road surface.

In another general aspect, an apparatus for displaying a three-dimensional (3D) object includes a single camera sensor, a processor, and a display. The single camera sensor is configured to acquire a driving image including a road surface. The processor is configured to classify line marks of the road surface into one or more groups based on a degree of change in a curvature of a line of the road surface, estimate a pitch angle of the road surface corresponding to an angle of inclination between the road surface and the single camera sensor for each of the one or more groups, and generate 3D information of the road surface using the pitch angle for each of the one or more groups. The display is configured to output a 3D object visually overlaid on the road surface based on the 3D information.

Other features and aspects will be apparent from the following detailed description, the drawings, and the claims.

Figure 1:
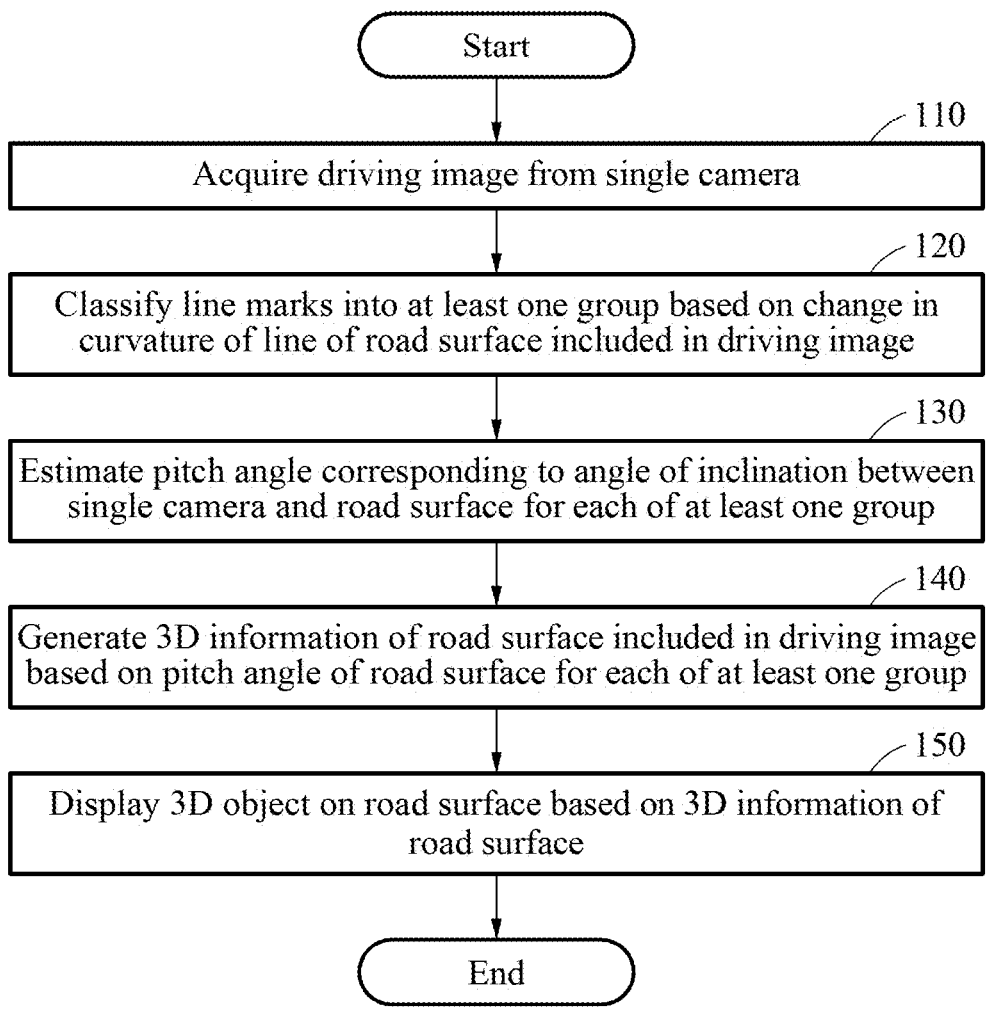
FIG. 1 is a flowchart illustrating an example method of displaying a three-dimensional (3D) object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood and in view of the disclosure of this application. Terms defined in dictionaries generally used should be construed to have meanings matching with contextual meanings in the related art and the disclosure of this application and are not to be construed as an ideal or excessively formal meaning unless otherwise defined herein.

Hereinafter, examples will be described in detail with reference to the accompanying drawings, and like reference numerals in the drawings refer to like elements throughout.

The following examples may include, or be applied to, display of a line in an augmented reality (AR) navigation system of a smart vehicle, or include generation of visual information and, or to assist, steering of an autonomous vehicle. Also, the examples may be used to, display of visual information including a three-dimensional (3D) object in example embodiments including an intelligent system, for example, a head-up display (HUD) installed for driving assistance in a vehicle or a fully autonomous driving, or other displays, to assist safe and comfortable driving. The examples include, or are applicable to, for example, an autonomous vehicle, an intelligent vehicle, a smartphone, an augmented reality (AR) HUD, or a mobile device.

FIG. 1 is a flowchart illustrating an example method of displaying a 3D object. Referring to FIG. 1, in operation 110, an apparatus (hereinafter, referred to as a "display apparatus") for displaying a 3D object acquires a driving image from a single camera. The driving image may include a road surface image and/or a road image including a vehicle, a lane, a curb, a sidewalk, and/or a surrounding environment, as shown in a driving image 210 of FIG. 2 in a non-limiting example. The driving image may include, for example, an RGB image or a gray image. The driving image may be a single frame image or a sequence of frame images collected over time. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The display apparatus may acquire one or more driving images for each frame using a single camera mounted on a front face of a driving vehicle. Calibration information of the single camera may be predetermined.

In operation 120, the display apparatus classifies line marks into one or more groups based on a determined change in a curvature of a line of a road surface included in the driving image. In the following description, the "line marks" correspond to, for example, a portion or all of marks for marking a line. For example, the display apparatus may group line marks based on a degree of change in a curvature of a line.

Prior to operation 120, the display apparatus may extract lines of the road surface corresponding to a driving lane from the driving image. For example, the display apparatus may extract a left line and a right line of the driving lane from the driving image. The display apparatus may extract lines by detecting line marks, or extract lines according to line probabilities for each pixel of the driving image based on a lane probability map. A method by which the display apparatus extracts lines of the road surface will be further described below with reference to FIG. 2.

In operation 120, the display apparatus may calculate curvatures of the extracted lines. For example, the display apparatus may calculate curvatures of a left line and a right line used to distinguish a driving lane from other lanes and/or curvatures of a left line and a right line of a lane other than the driving lane. The display apparatus may calculate a degree of change, for example, a variation, in each of curvatures of lines. The display apparatus may classify line mark portions that are regarded as straight lines based on a degree of change in each of curvatures of lines into one group. An example method by which the display apparatus classifies line marks into one or more groups will be further described below with reference to FIG. 3.

In operation 130, the display apparatus estimates a pitch angle of the road surface corresponding to an angle of inclination between the single camera and the road surface for each of the one or more groups. For example, a traveling direction on a road may be expressed as a change in an angle of the road surface because a localized area of the road surface gradually changes. Thus, 3D information of the road surface may be generated based on the pitch angle of the road surface. For example, the display apparatus may convert a partial image for each of the one or more groups in the driving image to a bird's eye view (BEV) image for each of the one or more groups. The display apparatus may estimate the pitch angle of the road surface based on the BEV image for each of the one or more groups. An example method by which the display apparatus estimates the pitch angle will be further described below with reference to FIGS. 4 and 5.

In operation 140, the display apparatus generates 3D information of the road surface included in the driving image based on the pitch angle of the road surface for each of the one or more groups. For example, when the driving image includes image sequences over time, the display apparatus may smoothen the pitch angle of the road surface for each of the one or more groups over time. A method by which the display apparatus smoothens the pitch angle will be further described below with reference to FIG. 6. The display apparatus may generate the 3D information of the road surface included in the driving image based on the smoothened pitch angle.

Since each group of line marks is assumed to be a plane, the roll angle in the 3D information of the road surface is assumed to be zero. Also, a yaw angle may be desired from the BEV image, and the pitch angle is estimated in operation 130. The display apparatus may generate the 3D information of the road surface based on the roll angle, the yaw angle and the pitch angle.

In operation 150, the display apparatus displays a 3D object on the road surface based on the 3D information of the road surface. An example method by which the display apparatus displays the 3D object on the road surface will be further described below with reference to FIG. 7.

In the following description, the term "road" refers to a path on which vehicles travel, and includes various types of roads such as, for example, a highway, a national road, a local road, an expressway, or a motorway, as non-limiting examples. In an example, the road includes one or more lanes.

The term "lane" refers to a road space distinguished by lines marked on a surface of the road. The term "driving lane" refers to a lane on which a driving vehicle is traveling among a plurality of lanes, that is, a lane space that is being occupied and used by the driving vehicle. A single lane is distinguished from other lanes by a left line and a right line thereof.

The term "lines" are understood as various types of line marks, for example, solid lines or broken lines marked in colors. The colors, for example, may include white, yellow or light blue on a road surface. Various types of lines belonging to line marks may include, for example, zigzag lines, lines of a bus lane or sidewalk dividers, in addition to lines to distinguish between lanes. In the following description, a left line and a right line to distinguish a single lane among lines are referred to as "lane boundary lines" to distinguish the left line and the right line from the other lines.

Also, the term "driving vehicle" refers to a vehicle of a user among vehicles that are traveling on a road, and corresponds to, for example, an autonomous vehicle, or an intelligent vehicle or smart vehicle equipped with an advanced driver-assistance system (ADAS).

Figure 2:
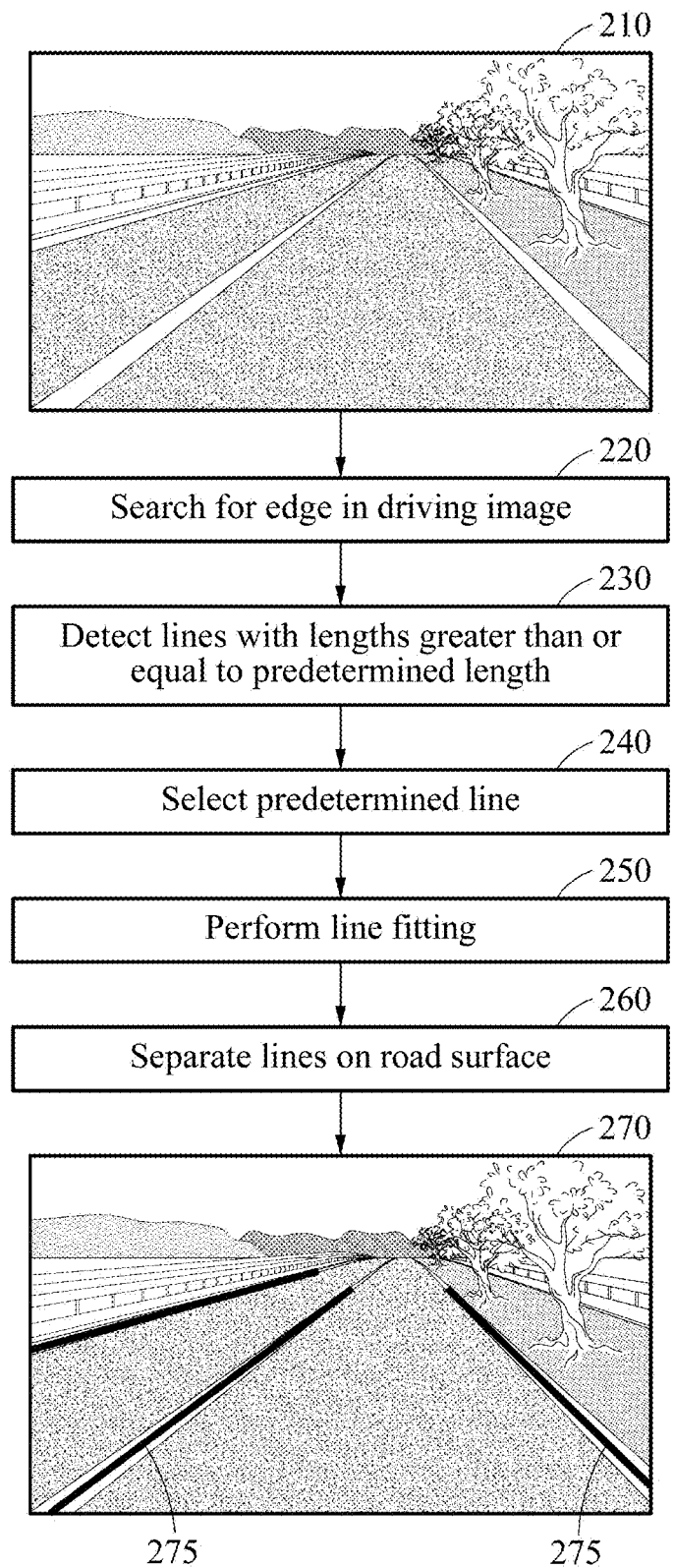
FIG. 2 illustrates an example method of extracting line marks of a road surface from a driving image.

FIG. 2 illustrates an example method of extracting line marks of a road surface from a driving image. In FIG. 2, in operation 220, a display apparatus searches for an edge in the driving image 210. For example, the display apparatus may search for an edge in the driving image 210 using a Canny edge detection scheme or a Hough transformation scheme, as non-limiting examples.

In operation 230, the display apparatus detects lines with lengths greater than or equal to a predetermined length from edges found in operation 220. The predetermined length may correspond to, for example, a length of a broken lane line or a length similar to the length of the broken lane line on a road surface.

In operation 240, the display apparatus selects a predetermined line from the lines detected in operation 230. The predetermined line may correspond to, for example, left and right lane boundary lines of a driving lane. For example, the display apparatus may group lines, for example, line marks, having lengths greater than or equal to a predetermined length based on a driving direction, and may select a predetermined line from a predetermined area representing a line feature or an edge among the grouped line marks. In an example, when the predetermined line is not selected from the predetermined area, the display apparatus may predict a candidate line with a highest possibility of being a line and may select the predetermined line.

In operation 250, the display apparatus performs a line fitting on the predetermined line selected in operation 240. Line marks of the driving road may be solid lines and/or broken lines. For example, when the line marks are broken lines or partially broken, the display apparatus may construct a single straight line or a single curve by connecting the broken lines or the partially broken line marks. The display apparatus may perform a line fitting on a predetermined line, that is, a lane boundary line.

For example, in an example where a portion of the line marks is hidden by an obstacle and/or invisible, the display apparatus may predict a line based on known information, for example, a width of a lane, a color of a lane except lines, or a partial line of a viewed portion. The display apparatus may estimate a confidence value based on a likelihood of the predicted line and may use the confidence value to generate the 3D information of the road surface.

In operation 260, the display apparatus separates lines on the road surface by the predetermined line on which the line fitting is performed in operation 250.

The display apparatus may separate lines 275 on the road surface as shown in the image 270 depicted in FIG. 2 through the above-described process.

The display apparatus may extract various lines or line marks from a driving image using, for example, a convolutional neural network (CNN), a deep neural network (DNN) or a support vector machine (SVM) trained in advance to recognize line marks of a road surface, depending on examples. The CNN may be trained in advance to recognize various line marks of a road surface image, and may be, for example, a region-based CNN. For example, the CNN may be trained to identify a bounding box of line marks together with a line to be detected from a driving image.

Figure 3:
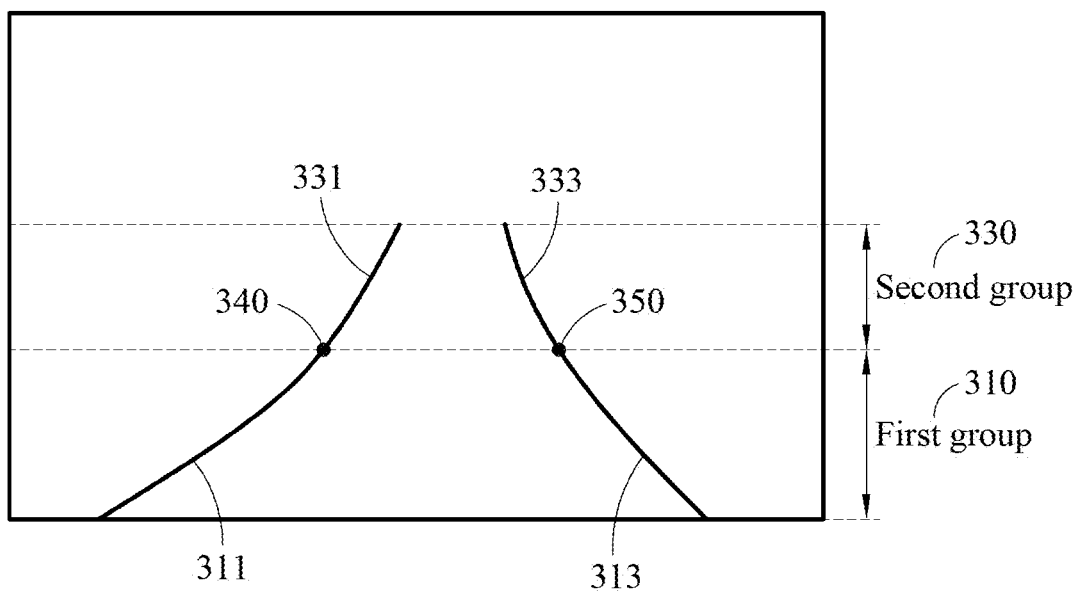
FIG. 3 illustrates an example method of classifying line marks into at least one group.

FIG. 3 illustrates an example method of classifying line marks into one or more groups. In FIG. 3, line marks 311 and 313 are classified into a first group 310, and line marks 331 and 333 are classified into a second group 330.

Lines separated by the above-described process may correspond to lane boundary lines used to distinguish a driving lane. The driving lane may be, for example, a straight section or a curved section. The display apparatus may distinguish between a straight section and a curved section based on curvatures of a left line and a right line, for example, of a driving lane on which a driving vehicle is traveling, such that both the straight section and the curved section may be represented by straight line marks.

In one or more examples, a single camera is included to capture a front view image in a direction in which a vehicle is traveling. In this example, line marks at the same height, among line marks of a left line and a right line of a driving lane in a captured driving image, are predicted to have the same depth. Thus, line marks of a left line and a right line at the same height are classified into one group. Height may refer to the distance between a lower end of a group and an upper end of the same group. The display apparatus may group the line marks based on both a change in a curvature of the left line and a change in a curvature of the right line.

The display apparatus may compare a reference variation to the degree of changes in the curvature of each of the left line and the right line segmented into a group based on the same height. The display apparatus may classify line marks into groups based on a point at which the degree of change in the curvatures of the left line and the right line is greater than the reference variation.

For example, points 340 and 350 of FIG. 3 are depicted to be points at which the degree of change in the curvature of each of a left line and a right line is greater than the reference variation. The display apparatus classifies the line marks 311 and 313 into the first group 310 and classifies the line marks 331 and 333 into the second group 330, based on the points 340 and 350. In this example, the road surface corresponding to the first group 310 forms a relatively flat plane having a parallelogram shape. Also, the road surface corresponding to the second group 330 forms a relatively flat plane having a parallelogram shape distinguishable from the first group 310.

In an example, when only one group is formed in the driving image, the entire road surface in the driving image may form a single flat plane. In another example, when more than one group, e.g., five groups, are formed in the driving image, the road surface in the driving image may be segmented into five sections and curvatures corresponding to, at least, adjoining sections of the five sections in the road surface may be predicted to be relatively different from each other.

Figure 4:
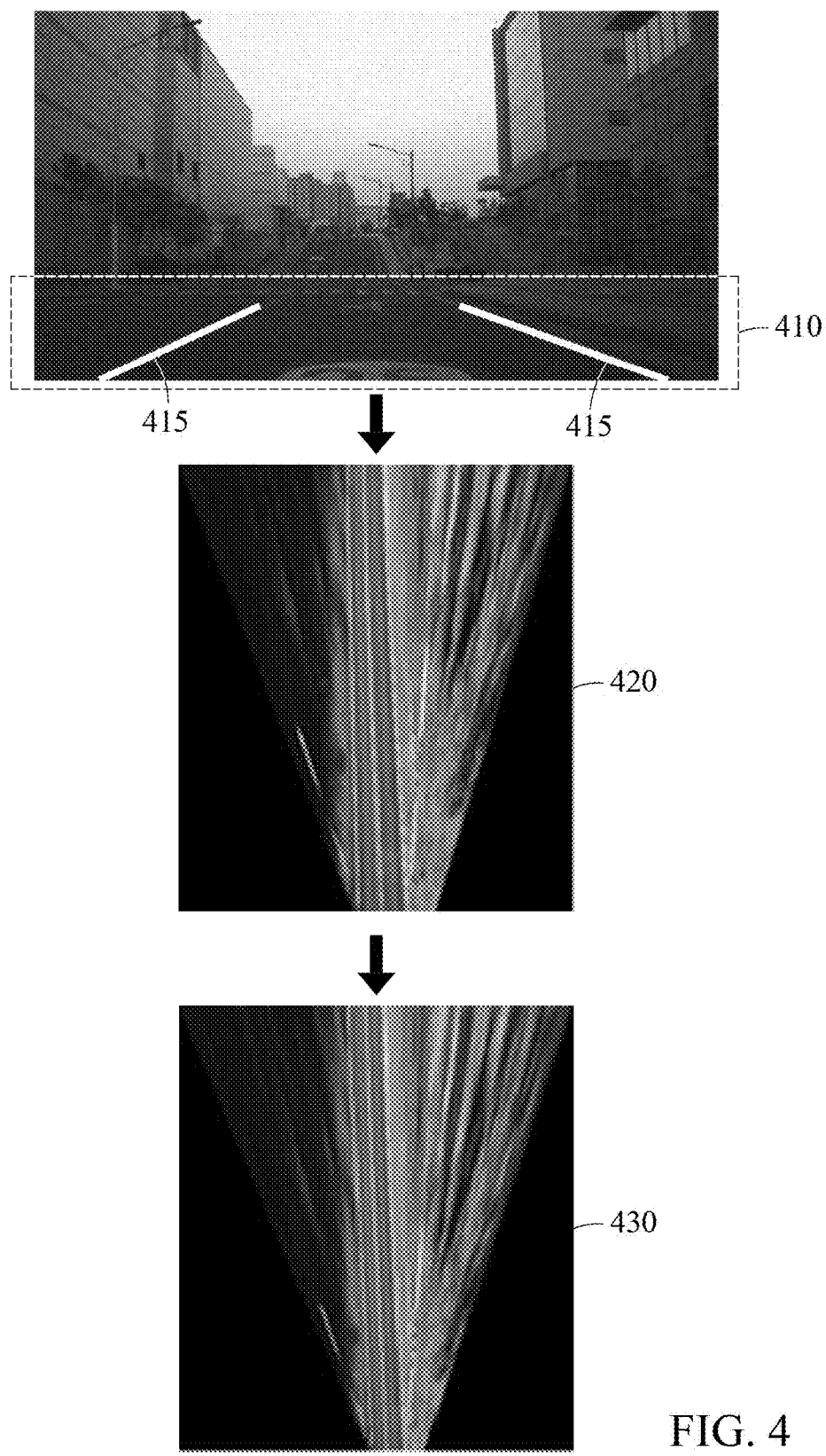
FIG. 4 illustrates an example method of estimating a pitch angle.

FIG. 4 illustrates an example method of estimating a pitch angle. FIG. 4 illustrates a partial image 410 showing line marks 415, a bird's-eye-view (BEV) image 420 obtained by converting the partial image 410, and an image 430 in which positions of the line marks 415 are adjusted by a pitch angle estimated from the BEV image 420.

A display apparatus converts the partial image 410 for each of the groups, e.g. one group in this example, in the driving image to the BEV image 420. In this example, the BEV image 420 is obtained by converting the partial image 410 corresponding to one group formed by classifying the line marks 415 in the driving image, instead of converting the entire driving image.

The line marks 415 in the partial image 410 are displayed to converge toward a vanishing point. When the partial image 410 is converted to the BEV image 420, line marks appearing in the BEV image 420 may be parallel to each other when the partial image 410 is viewed from above. In an example where a road surface in the partial image 410, for example, has an angle of inclination, the line marks appearing in the BEV image 420 may diverge or converge at a predetermined angle, instead of being parallel to each other. In an example, an angle that allows the line marks appearing in the BEV image 420 to be parallel to each other may be determined, and the angle may correspond to a pitch angle.

For example, the display apparatus may convert the partial image 410 to the BEV image 420 using an inverse perspective mapping (IPM). The IPM removes a distance effect from the partial image 410 having the distance effect and converts position information of a plane of the partial image 410 to position information of a world coordinate system. By the IPM, the position information of the plane of the partial image 410 is converted to position information of the world coordinate system.

For example, it is assumed that a roll value does not exist because a driving vehicle does not move in a roll angle direction. In this example, a yaw angle yaw($\psi$) and a pitch angle pitch($\theta$) on the plane of the partial image 410 may be expressed as $$(\text{yaw}(\psi))^{-1} = \begin{pmatrix} \cos\psi & \sin\psi & 0 \\ -\sin\psi & \cos\psi & 0 \\ 0 & 0 & 1 \end{pmatrix} \text{ and } (\text{pitch}(\theta))^{-1} = \begin{pmatrix} 1 & 0 & 0 \\ 0 & \cos\theta & \sin\theta \\ 0 & -\sin\theta & \cos\theta \end{pmatrix},$$

respectively.

Also, world coordinates ($x_{world}$, $y_{world}$, $z_{world}$) corresponding to the partial image 410 are expressed as shown in Equation 1 below, for example.

$$\begin{pmatrix} x_{world} \\ y_{world} \\ z_{world} \end{pmatrix} = (\text{yaw}(\psi))^{-1} \times (\text{pitch}(\theta))^{-1} \times \begin{pmatrix} -H/fx & 0 & H \times cx/fx \\ 0 & 0 & -H \\ 0 & H/fy & -H \times cy/fy \end{pmatrix} \begin{pmatrix} u \\ v \\ 1 \end{pmatrix}$$

Equation 1

The display apparatus may remove the distance effect from the world coordinates ($x_{world}$, $y_{world}$, $z_{world}$) of the partial image 410 and convert the position information of the plane of the partial image 410 into position information of a world coordinate system, as shown in Equation 2 below, for example.

$$\begin{pmatrix} \hat{x} \\ \hat{y} \end{pmatrix}_{BEV} = \begin{pmatrix} x_{world}/z_{world} \\ y_{world}/z_{world} \end{pmatrix}$$

Equation 2

In Equation 2, $$z_{world} = \left(0, -\frac{\cos\theta}{fy}, -\sin\theta + \cos\theta * \frac{cy}{fy}\right)\begin{pmatrix} u \\ v \\ 1 \end{pmatrix}.$$

The display apparatus may acquire the BEV image 420 by applying the IPM based on a central portion of a bounding box corresponding to the partial image 410. In one or more examples, the display apparatus may apply the IPM to the detected line marks 415, excluding a background portion of the partial image 410, thereby reducing an amount of calculation.

In one or more examples, the display apparatus may estimate the BEV image 420 corresponding to the partial image 410 by performing the IPM based on calibration information of a single camera acquired in advance. The calibration information may include, for example, an extrinsic parameter.

The display apparatus may estimate a pitch angle of the road surface based on the BEV image 420. A reference position of the BEV image 420 may be changed based on a gradient $\theta$ of the road surface. For example, when the partial image 410 is converted to the BEV image 420, the display apparatus may estimate, as the pitch angle of the road surface, an angle that satisfies at least one of a first condition that the line marks 415 in the partial image 410, that is, left and right line marks 415 included in the same group are parallel to each other, and a second condition that the line marks 415 have the same length.

The display apparatus calculates positions of line marks included in the BEV image 420 for each of the groups based on an initial pitch angle. The display apparatus may repeatedly adjust the pitch angle until the line marks included in the BEV image 420 satisfy either one or both of the first condition and the second condition. The display apparatus determines a pitch angle satisfying either one or both of the first condition and the second condition as the pitch angle of the road surface.

When the pitch angle allowing the line marks 415 to satisfy the above conditions is reflected in the BEV image 420, the positions of the line marks included in the BEV image 420 may be adjusted such that the line marks may be parallel to each other as shown in the image 430.

Figure 5:
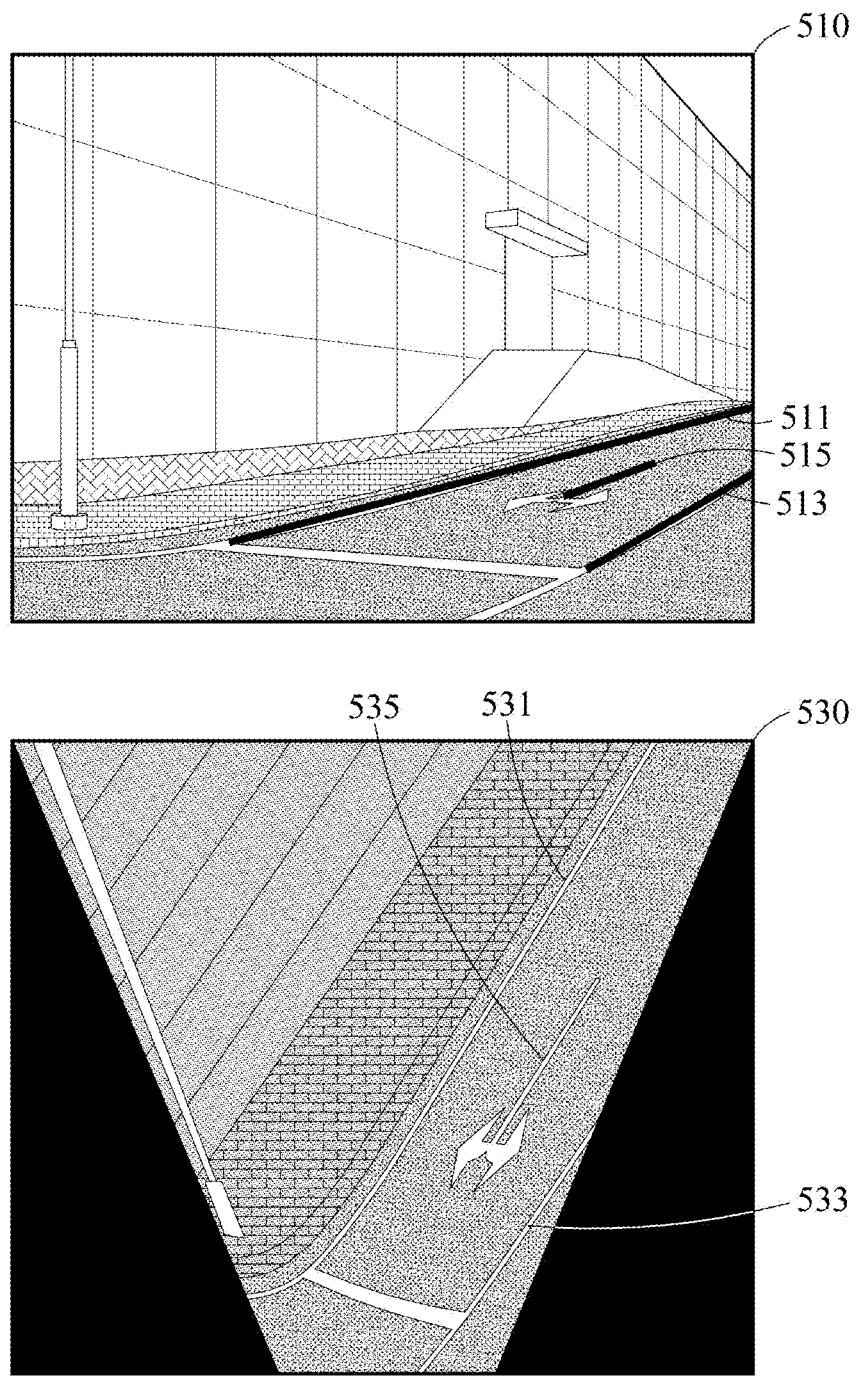
FIG. 5 illustrates an example method of estimating a pitch angle.

FIG. 5 illustrates an example method of estimating a pitch angle. FIG. 5 illustrates a driving image 510 and a BEV image 530.

For example, line marks 511, 513 and 515 appearing in the driving image 510 of a driving road having a predetermined gradient are not parallel to each other. A display apparatus converts the driving image 510 using the above-described IPM, optimizes a pitch angle to satisfy the above-described conditions, and generates the BEV image 530. In the BEV image 530, line marks 531, 533 and 535 are parallel to each other.

In this example, a parallel condition of the line marks 531, 533 and 535 extracted by the optimized pitch angle is not affected even though a yaw angle is not separately corrected.

In Equation 2, a coordinate system of $$z_{world} = \left(0, -\frac{\cos\theta}{fy}, -\sin\theta + \cos\theta * \frac{cy}{fy}\right)\begin{pmatrix} u \\ v \\ 1 \end{pmatrix}$$

represents a reference plane with a flat road surface. Also, Z corresponds to a height of the single camera that captured the driving image 510, for example.

When Z is reflected, the optimized pitch angle may be calculated, which will be described below.

For example, a slope of each of the line marks 531, 533 and 535 of a road surface included in the BEV image 530 is defined as $$slope_i = \left(\frac{\Delta \hat{x}_i}{\Delta \hat{y}_i}\right)_{BEV}.$$

In this example, the display apparatus may estimate the pitch angle by performing an optimization to satisfy Equation 3 shown below, for example.

$$\text{Minimize} \sum_i \left(\sum_i \frac{slope_i}{n} - slope_i\right) \Rightarrow \qquad \text{Equation 3}$$

$$\sum_i \left(\sum_i \frac{\frac{\partial slope_i}{\partial \theta}}{n} - \frac{\partial \cdot slope_i}{\partial \cdot \theta}\right) = 0$$

The display apparatus may estimate the pitch angle among 3D information of the road surface converted to the BEV image 530 through the above-described optimization.

Figure 6:
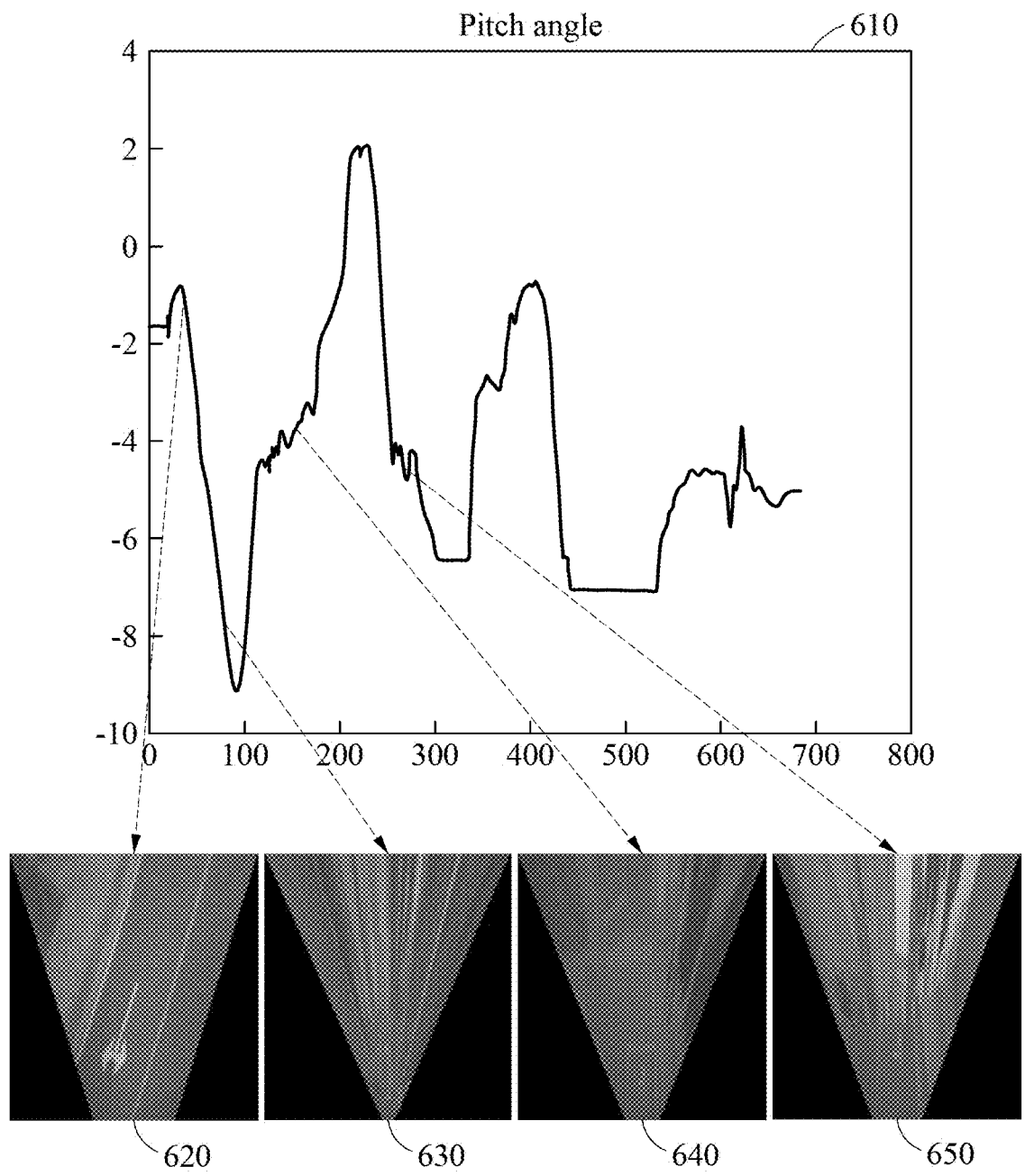
FIG. 6 illustrates an example method of smoothing a pitch angle.

FIG. 6 illustrates an example method of smoothing a pitch angle. FIG. 6 illustrates a graph 610 showing pitch angles that correspond to a driving image that changes over time, and BEV images 620, 630, 640 and 650 corresponding to the pitch angles changed in the driving image.

As shown in the BEV images 620, 630, 640 and 650 of FIG. 6, the value of pitch angles estimated over time varies. Thus, a pitch angle of a road surface for each of the one or more groups may be smoothened over time. For example, a display apparatus may smoothen the pitch angle of the road surface for each of the groups over time using a temporal filter, for example, a Kalman filter. The display apparatus may generate 3D information of the road surface included in the driving image based on the smoothened pitch angle.

Figure 7:
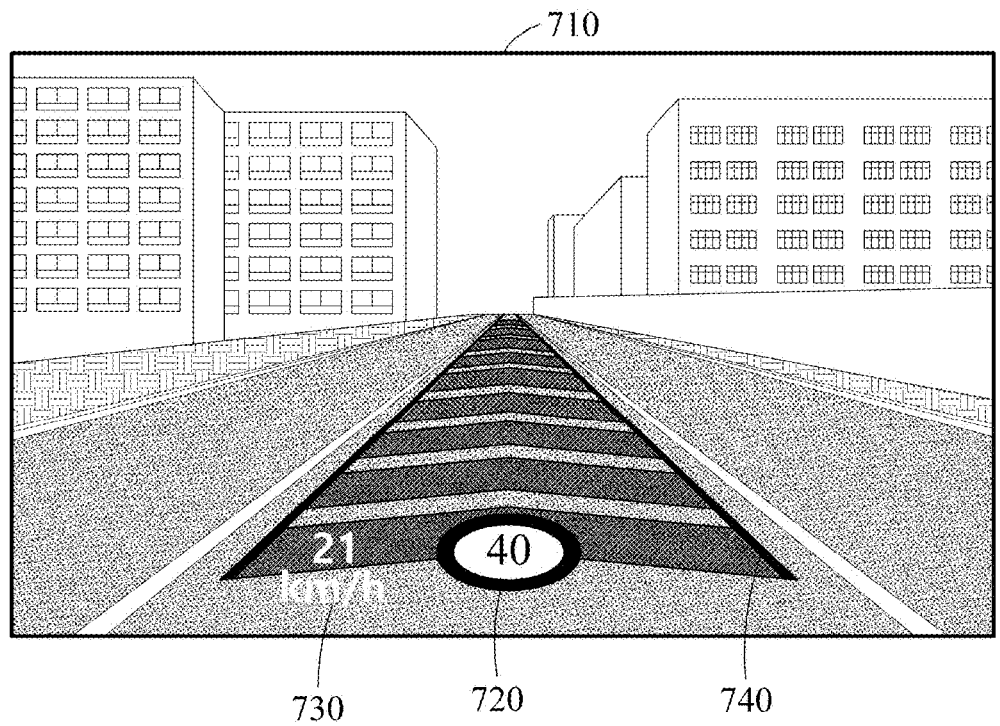
FIG. 7 illustrates an example 3D object displayed on a road surface.

FIG. 7 illustrates an example 3D object displayed and overlaid on a road surface. FIG. 7 illustrates a driving image 710 that includes a speed limit display object 720, a vehicle speed display object 730 and a road slope direction display object 740 that appear in the driving image 710.

In the example of FIG. 7, each of the groups from the driving image 710 is assumed to be a plane, and accordingly the roll angle of the 3D information of the road surface is regarded to be absent. Also, a yaw angle is acquired from a BEV image of the driving image 710, and a pitch angle is estimated through the above-described processes of FIGS. 1-6.

A display apparatus renders a 3D road model reflecting the 3D information of the road surface based on 3D information associated with the pitch angle, the roll angle and the yaw angle of the road surface acquired in the above-described process, and displays a 3D object on the 3D road model.

The display apparatus displays a 3D object that includes, for example, the speed limit display object 720, the vehicle speed display object 730 and the road slope direction display object 740, on the road surface of the driving image 710. The 3D object displayed on the road surface of the driving image 710 by the display apparatus is not necessarily limited thereto, and various 3D objects, for example, a pedestrian object, a vehicle object or a pet object, may be displayed. The 3D object may be a 3D virtual object, for example, an AR object that may be visually overlaid in a real-world environment, e.g., the road surface.

The display apparatus may overlay a 3D virtual object on the road surface, or allow an interaction between the road surface and the 3D virtual object.

Figure 8:
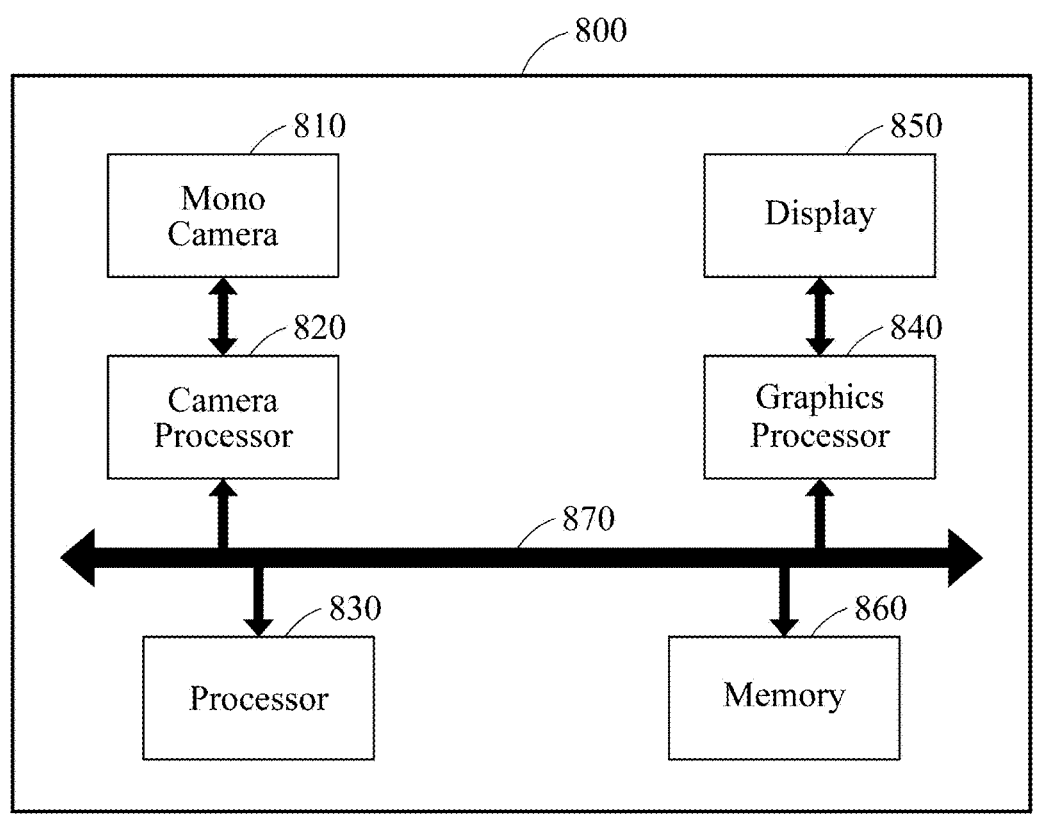
FIGS. 8 and 9 illustrate examples of an apparatus 800 for displaying a 3D object.

FIG. 8 illustrates an example display apparatus 800 for displaying a 3D object. In FIG. 8, the display apparatus 800 includes a mono camera 810, a camera processor 820, a processor 830, a graphics processor 840, a display 850 and a memory 860. The camera processor 820, the processor 830, the graphics processor 840 and the memory 860 communicate with each other via a communication bus 870.

The display apparatus 800 receives a driving image captured by the mono camera 810, and outputs a 3D road model and/or 3D information of a road surface included in the driving image.

The mono camera 810 captures the driving image.

The camera processor 820 converts a partial image for each of one or more groups in the driving image to a BEV image for each of the one or more groups by performing an IPM based on calibration information, for example, an extrinsic parameter, of the mono camera 810.

The processor 830 classifies line marks into one or more groups based on a change in a curvature of a line of the road surface in the driving image. The processor 830 estimates a pitch angle of the road surface based on the BEV image for each of the one or more groups. The processor 830 generates the 3D information of the road surface included in the driving image based on the pitch angle of the road surface for each of the one or more groups.

The graphics processor 840 renders a 3D road model reflecting the 3D information of the road surface and represents a 3D object on the 3D road model.

The display 850 displays the 3D road model representing the 3D object.

The memory 860 stores a final result and data generated in processing processes of the camera processor 820, the processor 830 and/or the graphics processor 840, in addition to the driving image captured by the mono camera 810.

Figure 9:
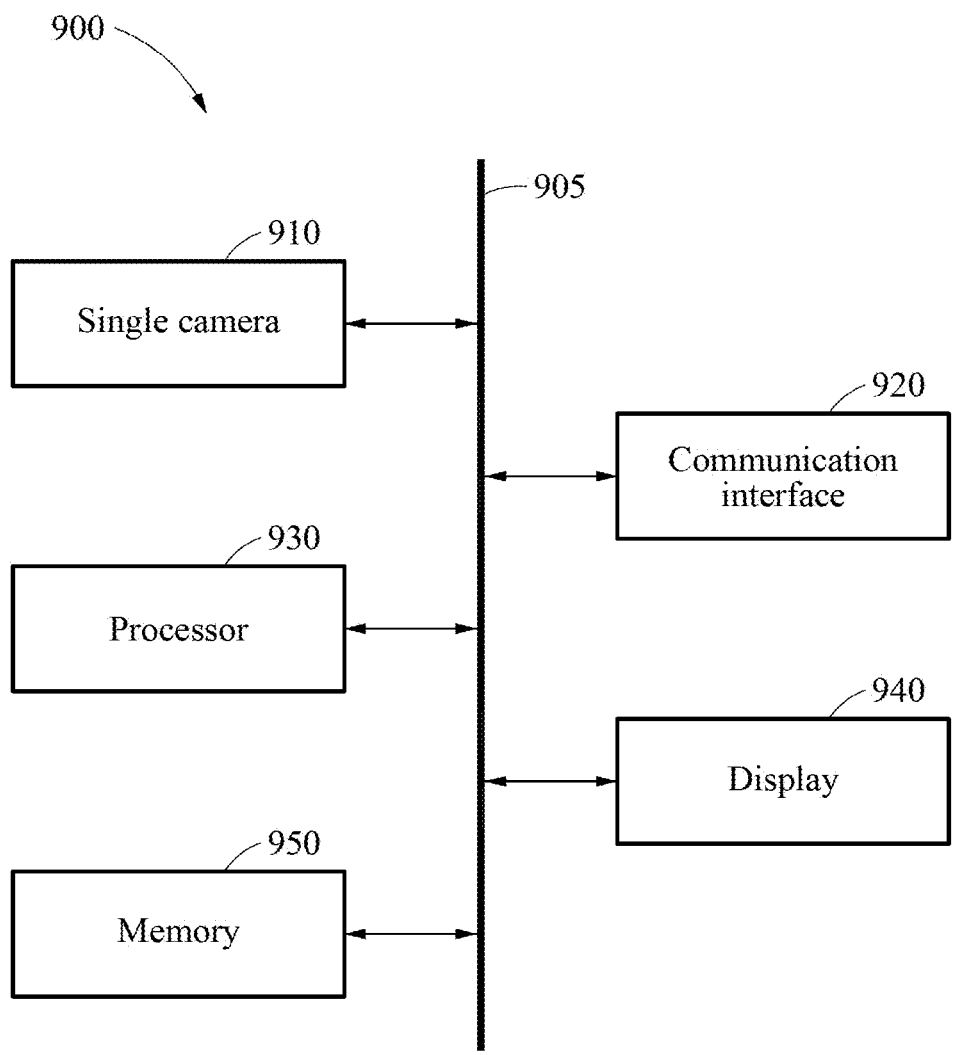

FIG. 9 is a block diagram illustrating an example display apparatus 900 for displaying a 3D object. In FIG. 9, the display apparatus 900 includes a single camera 910, a communication interface 920, a processor 930 and a display 940. The display apparatus 900 further includes a memory 950. The single camera 910, the communication interface 920, the processor 930, the display 940 and the memory 950 communicate with each other via a communication bus 905.

The display apparatus 900 may include, for example, an autonomous vehicle, an intelligent vehicle, a smartphone, or a mobile device.

The single camera 910 captures a driving image.

The communication interface 920 acquires the driving image from the single camera 910.

The communication interface 920 outputs 3D information of a road surface generated by the processor 930.

The processor 930 classifies line marks into one or more groups based on a change in a curvature of a line of a road surface included in the driving image. The processor 930 estimates a pitch angle of the road surface corresponding to an angle of inclination between the single camera 910 and the road surface for each of the one or more groups. The processor 930 generates 3D information of the road surface included in the driving image based on the pitch angle for each of the one or more groups. The processor 930 represents a 3D object on the road surface based on the 3D information of the road surface.

The display 940 displays a 3D road model representing a 3D object. The display 940 may include, for example, an AR HUD.

The memory 950 stores the driving image, and/or the 3D road model representing the 3D object.

Also, the processor 930 performs one or more of the processes or methods described herein with reference to FIGS. 1 through 8, e.g., through one or more processes that are configured by the execution of instructions to perform the one or more or all processes or methods described herein. The processor 930 is a hardware-implemented data processing device having a circuit that is physically structured to execute desired operations. For example, the desired operations include code or such instructions, e.g., included in a program. The hardware-implemented data processing device includes, for example, a microprocessor, a central processing unit (CPU), a processor core, a multi-core processor, a multiprocessor, an application-specific integrated circuit (ASIC), and a field-programmable gate array (FPGA).

The processor 930 executes a program and controls the display apparatus 900. Codes of the program executed by the processor 930 are stored in the memory 950.

The memory 950 stores a variety of information generated in the above-described processing process of the processor 930. Also, the memory 950 stores a variety of data and programs. The memory 950 includes, for example, a volatile memory or a non-volatile memory. The memory 950 includes a high-capacity storage medium such as a hard disk to store a variety of data.

The display apparatus 800, mono camera 810, single camera 910, camera processor 820, processor 830, 930, display 850, 940, graphic processor 840, memory 860, 950, communication interface 920, display apparatuses, processors, apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    acquiring a driving image including a road surface from a single camera;
    extracting lines of the road surface corresponding to a driving lane from the driving image by detecting lines having lengths greater than or equal to a predetermined length included in the driving image by searching for an edge in the driving image, and estimating the lines of the road surface corresponding to the driving lane by grouping the detected lines based on a driving direction;
    calculating curvatures of the extracted lines;
    classifying line marks of the road surface into one or more groups based on a degree of change in a curvature of a line of the extracted lines;
    estimating a pitch angle of the road surface, corresponding to an angle of inclination between the road surface and the single camera, for each of the one or more groups;
    generating three-dimensional (3D) information of the road surface using the pitch angle of the road surface for each of the one or more groups; and
    displaying a 3D object visually overlaid on the road surface based on the 3D information.

2. The method of claim 1, wherein the classifying of the line marks comprises grouping the line marks based on the degree of change in the curvature of the line.

3. The method of claim 1, wherein the classifying of the line marks comprises:
    comparing the degree of change in the curvature of the line to a reference variation; and
    classifying, based on a result of the comparing, the line marks into a plurality of groups based on a point at which the degree of change in the curvature is greater than the reference variation.

4. The method of claim 1, wherein each of the one or more groups form a corresponding flat plane different from each other on the road surface.

5. The method of claim 1, wherein the estimating of the pitch angle of the road surface for each of the one or more groups comprises:
    converting a partial image of the driving image for each of the one or more groups to a bird's-eye-view (BEV) image for each of the one or more groups; and
    estimating the pitch angle of the road surface for each of the one or more groups based on the BEV image for each of the one or more groups.

6. The method of claim 5, wherein the estimating of the pitch angle of the road surface for each of the one or more groups comprises:
    estimating, as the pitch angle of the road surface, a pitch angle satisfying either one or both of a first condition that line marks included in the BEV image for each of the one or more groups are parallel to each other and a second condition that the line marks have the same length.

7. The method of claim 6, wherein the estimating of the pitch angle of the road surface for each of the one or more groups comprises:
    calculating positions of the line marks included in the BEV image for each of the one or more groups based on an initial pitch angle;
    repeatedly adjusting the pitch angle until either one or both of the first condition and the second condition are satisfied; and
    determining a pitch angle satisfying either one or both of the first condition and the second condition as the pitch angle of the road surface.

8. The method of claim 1, wherein
    the driving image comprises image sequences over time, and the generating of the 3D information of the road surface comprises:
smoothing the pitch angle of the road surface for each of the one or more groups over time; and
generating the 3D information of the road surface included in the driving image using the smoothened pitch angle.

9. The method of claim 8, wherein the smoothing of the pitch angle of the road surface comprises smoothing, using a temporal filter, the pitch angle of the road surface for each of the one or more groups over time.

10. The method of claim 1, wherein the displaying of the 3D object comprises:
rendering a 3D road model reflecting the 3D information of the road surface; and
displaying the 3D object visually overlaid on the 3D road model.

11. The method of claim 1, further comprising:
extracting a left line and a right line of the driving lane from the driving image; and
calculating curvatures of the left line and the right line of the driving lane.

12. The method of claim 1, further comprising:
outputting the 3D information of the road surface.

13. The method of claim 1, wherein the driving image comprises either one or both of an RGB image and a gray image.

14. A non-transitory computer-readable storage medium storing instructions that, when executed by a processor, cause the processor to perform the method of claim 1.

15. An apparatus, the apparatus comprising:
a communication interface configured to acquire a driving image including a road surface from a single camera;
a processor configured to;
extract lines of the road surface corresponding to a driving lane from the driving image;
detect lines having lengths greater than or equal to a predetermined length included in the driving image by searching for an edge from the driving image, and estimate the lines of the road surface corresponding to the driving lane by grouping the detected lines based on a driving direction;
calculate curvatures of the extracted lines;
classify line marks of the road surface into one or more groups based on a degree of change in a curvature of a line of the detected lines;
estimate a pitch angle of the road surface corresponding to an angle of inclination between the road surface and the single camera for each of the one or more groups;
generate three-dimensional (3D) information of the road surface using the pitch angle of the road surface for each of the one or more groups; and
represent a 3D object visually overlaid on the road surface based on the 3D information; and
a display configured to display a 3D road model representing the 3D object.

16. The apparatus of claim 15, wherein the processor is further configured to group the line marks based on the degree of change in the curvature of the line.

17. The apparatus of claim 15, wherein the processor is further configured to compare the degree of change in the curvature of the line to a reference variation, and to classify, based on a result of the comparing, the line marks into a plurality of groups based on a point at which the degree of change in the curvature is greater than the reference variation.

18. The apparatus of claim 15, wherein each of the one or more groups form a corresponding flat plane different from each other on the road surface.

19. The apparatus of claim 15, wherein the processor is further configured to convert a partial image of the driving image for each of the one or more groups to a bird's-eye-view (BEV) image for each of the one or more groups, and to estimate the pitch angle of the road surface based on the BEV image for each of the one or more groups.

20. The apparatus of claim 19, wherein the processor is further configured to estimate, as the pitch angle of the road surface, a pitch angle satisfying either one or both of a first condition that line marks included in the BEV image for each of the one or more groups are parallel to each other and a second condition that the line marks have the same length.

21. The apparatus of claim 20, wherein the processor is further configured to calculate positions of the line marks included in the BEV image for each of the one or more groups based on an initial pitch angle, to repeatedly adjust the pitch angle until either one or both of the first condition and the second condition are satisfied, and to determine a pitch angle satisfying either one or both of the first condition and the second condition as the pitch angle of the road surface.

22. The apparatus of claim 15, wherein
the driving image comprises image sequences over time, and
the processor is further configured to smooth the pitch angle of the road surface for each of the one or more groups over time, and to generate the 3D information of the road surface included in the driving image using the smoothened pitch angle.

23. The apparatus of claim 22, wherein the processor is further configured to smooth, using a temporal filter, the pitch angle of the road surface for each of the one or more groups over time.

24. The apparatus of claim 15, wherein the processor is further configured to render a 3D road model reflecting the 3D information of the road surface, and to represent the 3D object on the 3D road model.

25. The apparatus of claim 15, wherein the processor is further configured to extract a left line and a right line of the driving lane from the driving image, and to calculate curvatures of the left line and the right line of the driving lane.

26. The apparatus of claim 15, wherein the communication interface is configured to output the 3D information of the road surface.

27. An apparatus, comprising:
a single camera sensor configured to acquire a driving image including a road surface; and
a processor configured to;
extract lines of the road surface corresponding to a driving lane from the driving image;
detect lines having lengths greater than or equal to a predetermined length included in the driving image by searching for an edge from the driving image, and estimate the lines of the road surface corresponding to the driving lane by grouping the detected lines based on a driving direction;
calculate curvatures of the extracted lines;
classify line marks of the road surface into one or more groups based on a degree of change in a curvature of a line of the road surface;
estimate a pitch angle of the road surface corresponding to an angle of inclination between the road surface and the single camera sensor for each of the one or more groups; and generate 3D information of the road surface using the pitch angle for each of the one or more groups.

28. The apparatus of claim 27, wherein a display is configured to output a 3D object visually overlaid on the road surface based on the 3D information.

* * * * *